United States Patent
Ueda

[11] Patent Number: 6,126,106
[45] Date of Patent: Oct. 3, 2000

[54] CASSETTE ADAPTER AND MAGNETIC RECORDING/REPRODUCTION APPARATUS

[75] Inventor: Mikiya Ueda, Kobe, Japan

[73] Assignee: Matsushita Electric Industrial Co., Ltd., Osaka, Japan

[21] Appl. No.: 09/270,758

[22] Filed: Mar. 17, 1999

Related U.S. Application Data

[62] Division of application No. 08/836,639, filed as application No. PCT/JP96/02788, Sep. 26, 1996, Pat. No. 5,934,591.

[30] Foreign Application Priority Data

Sep. 28, 1995 [JP] Japan ................................. 7-250674
Oct. 6, 1995 [JP] Japan ................................. 7-259760

[51] Int. Cl.[7] ........................... G11B 23/04; G11B 15/00
[52] U.S. Cl. ........................ 242/336; 242/338; 242/357; 360/94
[58] Field of Search .................................. 242/336, 338, 242/357; 360/94

[56] References Cited

U.S. PATENT DOCUMENTS

| | | | |
|---|---|---|---|
| 3,610,552 | 10/1971 | Shirakura et al. | 242/199 |
| 4,622,605 | 11/1986 | Tsuruoka et al. | 360/94 |
| 5,034,832 | 7/1991 | Sato et al. | 360/94 |
| 5,173,818 | 12/1992 | Chan | 360/94 |
| 5,365,393 | 11/1994 | Weber et al. | 360/132 |
| 5,402,954 | 4/1995 | Skavnak et al. | 242/336 |

FOREIGN PATENT DOCUMENTS

| | | |
|---|---|---|
| 0 367 454 | 5/1990 | European Pat. Off. . |
| 0 533 181 | 3/1993 | European Pat. Off. . |
| 60-40545 | 3/1985 | Japan . |
| 5-250840 | 9/1993 | Japan . |

*Primary Examiner*—John Q. Nguyen
*Attorney, Agent, or Firm*—McDermott, Will & Emery

[57] ABSTRACT

A casette adapter in which an S-casette (first casette) of the professional digital video format is housed and having a shape identical with an different-sized M-casette (second casette) operates without fail under a simple constitution, without accompanying any fear of damage on a tape. The casette adapter capable of housing an S-casette (2) comprises an adapter (1) whose shape is identical to an different-sized M-casette. Reels (5, 6) and a reel brake releasing member (7) of the S-casette (2) are exposed while the S-casette is mounted in the casette adapter. The adaptor (1) includes a rear door (12) capable of opening and closing. The rear door (12) comprises contacts (14) for reading identification signal by contacting the identification terminal of S-casette, wirings (16) for coupling the contacts (14) with an identification terminal (15) provided in a same location as that of M-casette and a lever (18) for opening/closing an anti-erasing window in linkage with the anti-erasing gear of S-casette (2). A device for distinguishing the adapter from the M cassette and for preventing further insertion of the adapter.

4 Claims, 5 Drawing Sheets

CASSETTE ADAPTER AND MAGNETIC RECORDING/REPRODUCTION APPARATUS

This is a divisional of application Ser. No. 08/836,639, filed Aug. 4, 1997, U.S. Pat. No. 5,934,591, which is a 371 of PCT/JP96/02788 filed Sep. 26, 1996.

TECHNICAL FIELD

The present invention relates to a casette adapter for the S-casette (first casette) of professional digital video format, which casette adapter being formed in a same shape as the M-casette (second casette) the size of which is different from the S-casette, as well as a magnetic recording/reproducing apparatus on which the casette adapter is to be loaded.

BACKGROUND ART

There has been a VHS casette adapter as shown in FIG. 6, where a C-casette 25 is inserted in an adapter 26 which has a same size as that of a full-size VHS casette playable on a magnetic recording/reproducing apparatus.

In the adapter, C-casette 25 is mounted in adapter 26 from the top surface with a tape protection lid 27 of the C-casette open, and a protection cover in the top surface of adapter 26 is closed for operation. A reel brake (not shown) of C-casette 25 is released when a C-casette is mounted in the adapter 26 by a lock releasing pin (not shown) provided on adaptor 26.

After the protection cover of adapter 26 is closed, tape 28 is pulled out of C-casette 25 by a pulling post 29 to be placed to a same position as that of the full-size casette in preparation for loading in a magnetic recording/reproducing apparatus.

As the adapter 26 incorporating a C-casette 25 assumes an exactly the same shape and function as a full-size VHS casette, no extra switching gear needs to be provided in a magnetic recording/reproducing apparatus for recording and reproducing with the adapter.

In the professional digital video format, there are two casette forms; an S-casette (S signifies small; a first casette in the present invention) and an M-casette of different size (M signifies middle; a second casette in the present invention). If the same structure as in the VHS format is introduced for the professional digital video version, problems arise. Namely, as the space between the reels is small in the S-casette and the M-casette, the coupling of reel movement will become very complicated when forming a casette adapter (for adapting an S-casette for the M-casette shape) with the reel placed in the same position as that of the M-casette. Furthermore, if reel brake is released when an S-casette is mounted in an adapter the reel is left unlocked and tape becomes loose inviting a damage.

Difference in the level of top surface between S-casette and M-casette is 1 mm. Therefore it is difficult to provide a protection cover on the top surface of an adapter for covering S-casette; which means that an S-casette can not be mounted in from the top surface, and it becomes very difficult to couple the identification terminal and the anti-erasing gear of an S-casette with the counterparts of the adapter which are disposed in the places corresponding to those of the M-casette.

Furthermore, because both the casette adapter and the M-casette assume an identical shape it is impossible for a magnetic recording/reproducing apparatus to judge whether the one being loaded is a casette adapter or an M-casette. Therefore, in a case when a casette adapter is loaded in a magnetic recording/reproducing apparatus which is incompatible with adapter, there will be a possiblity of broken equipment.

DISCLOSURE OF THE INVENTION

The present invention is intended to solve the above described problems with a simple structure, and presents as a first objective an adapter for the S-casette of professional digital video format, the shape of adapter being the same as the M-casette, whose constitution is simple yet assures a reliable operation without a fear of damage on tape etc., and as a second objective, a magnetic recording/reproducing apparatus which is capable of identifying a casette adapter and an M-casette by a simple mechanism.

For implementing the above described first objective, a casette adapter according to the present invention comprises an adapter having a same shape as an M-casette (second casette), the size being different from an S-casette (first casette), for mounting the S-casette in. Reels and a reel brake releasing member of the S-casette are exposed while the S-casette is mounted in the adapter. The adapter is provided with a rear door which comprises a contact for reading identification signal by touching an identification terminal of S-casette, a wiring member for coupling the contact with an identification terminal disposed at the same location as that of M-casette, and a lever to open/close an anti-erasing window in linkage with the anti-erasing gear of an S-casette mounted in the adapter.

Under the above described constitution, as the reel and the reel brake releasing member of S-casette mounted in the adapter remain in the same location as they were as an S-casette, there is no need of providing mechanisms for coupling respectively the reel operation and the reel brake releasing member. Thus an adapter may be formed very simple. Furthermore, as the reading of identification signal from the S-casette and the open/close work of anti-erasing window are performed solely by the rear door, a reliable operation is ensured from the simple structure.

In order to implement the second objective, a magnetic recording/reproducing apparatus according to the present invention comprises a shape identification means which can receive a casette adapter of the same shape as the M-casette incorporating an S-casette, and at the same time identifies whether it is a casette adapter or an M-casette. Based on the detection by the shape identification means, the mechanical and electrical systems of the magnetic recording/reproducing apparatus are modified accordingly to accept a casette adapter.

Under the above described constitution, both the mechanical and electrical systems of an adapter-compatible magnetic recording/reproducing apparatus are easily modified to drive a casette adapter.

BEST MODE FOR CARRYING OUT THE INVENTION

Figure 1:
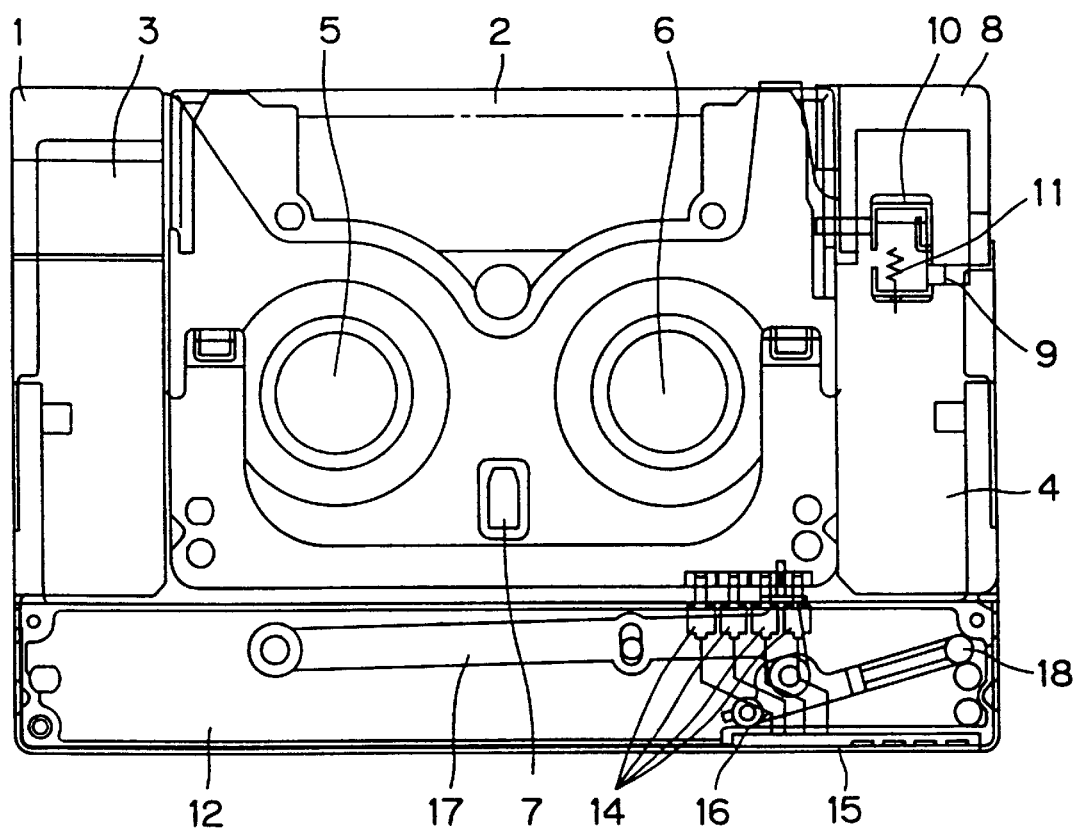
FIG. 1 is a plane view of a casette adapter according to a first embodiment of the present invention.
Figure 2:
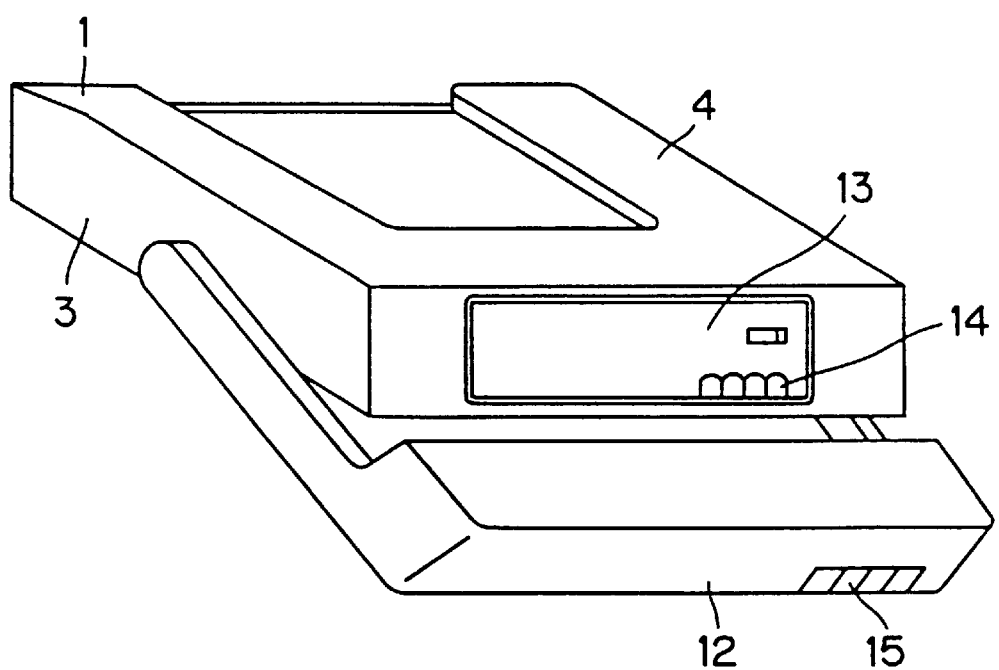
FIG. 2 is a perspective view showing the casette adapter of FIG. 1, with the rear door open.

A first embodiment of the present invention is described in the following with reference to FIG. 1 and FIG. 2. FIG. 1 shows a plane view of a casette adapter compatible with the professional digital video format, FIG. 2 is a detailed view of a portion for inserting an S-casette.

As shown in FIG. 1, an adapter 1 assumes a same shape as the M-casette (second casette), has a right and a left casette guides 3, 4 for guiding an S-casette (first casette) 2 to the centre of adapter 1. While an S-casette 2 is being mounted in the adapter 1, reels 5, 6 and a reel brake releasing member 7 of the S-casette 2 are exposed.

An operation coupling member 8 is for releasing the lock and opening/closing a casette lid of S-casette 2 by making use of a mechanism of a magnetic recording/reproducing apparatus to open/close a casette lid of M-casette. A lever 9 is disposed on a place corresponding to a lock releasing lever (not shown) for casette lid of M-casette on a magnetic recording/reproducing apparatus. A lever 10 is disposed on a place corresponding to a locking member (not shown) for casette lid of S-casette 2, and is provided with a spring 11 and coupled with the lever 9. Namely, the lock of casette lid for protecting magnetic tape of S-casette 2 is released by the levers 9, 10 and spring 11 which are coupled with a means for releasing the lock of M-casette lid in a magnetic recording/reproducing apparatus.

A rear door 12 is for fixing an S-casette 2 inserted through a mounting slot 13. The rear door 12 comprises contacts 14 touching to the identification terminal of S-casette 2, identification terminal 15 for outputting an M-casette identification signal, wiring members 16 for coupling the contacts 14 with the identification terminal 15, a moving member 17 which moves in compliance with the open/close of anti-erasing gear of S-casette 2, and a lever 18 which opens/closes the anti-erasing window of M-casette in compliance with the moving member 17.

With the above described constitution, the operation is described in the following. For mounting an S-casette 2 in adapter 1, the rear door 12 of adapter 1 is lowered as shown in FIG. 2 and then an S-casette 2 is inserted to the opened mounting slot 13. The S-casette 2 is guided to a specified position by the casette guides 3, 4 disposed at the right and left of adapter 1.

In the state where an S-casette 2 is being mounted, as the reels 5, 6 and the reel brake releasing member 7 are exposed, the positioning of reels 5, 6 and reel brake releasing member 7 of the S-casette mounted in adapter 1 remain the same as that of an S-casette 2. Therefore, there is no need of providing a mechanism for coupling respectively the reel operation and reel brake releasing action. Thus, an adapter is constituted with a very simple structure.

Next, the rear door 12 is pushed up to fix S-casette 2. The contacts 14 embodied in the rear door 12 for reading the identification terminal of S-casette 2 make contact, and the moving member 17 moves in accordance with the open/close of the anti-erasing gear of S-casette 2. As the contacts 14 are electrically coupled with identification terminal 15 of adapter 1 through wirings 16, the information in the identification terminal can be read out at the same location as that of M-casette. The moving member 17 is coupled via a pin with lever 18 provided for opening/closing the anti-erasing window of M-casette, and opens/closes the anti-erasing window of M-casette inaccordance with the open/close of anti-erasing gear of S-casette 2.

In the state when an S-casette 2 is being inserted in adapter 1, a casette lid lock member of the S-casette 2 is still out of functioning because the lever 10 is retained by spring 11; the lid of S-casette 2 is kept closed protecting the tape from a possible damage, and the S-casette is protected from intrusion of dusts.

When the adapter 1 is loaded in a magnetic recording/erproducing apparatus, the lever 9 is driven by a lock releasing lever of the magnetic recording/reproducing apparatus provided for unlocking casette lid of an M-casette, and the lever 10 coupled with lever 9 is revolved to unlock the casette lid lock member of S-casette 2.

Figure 3:
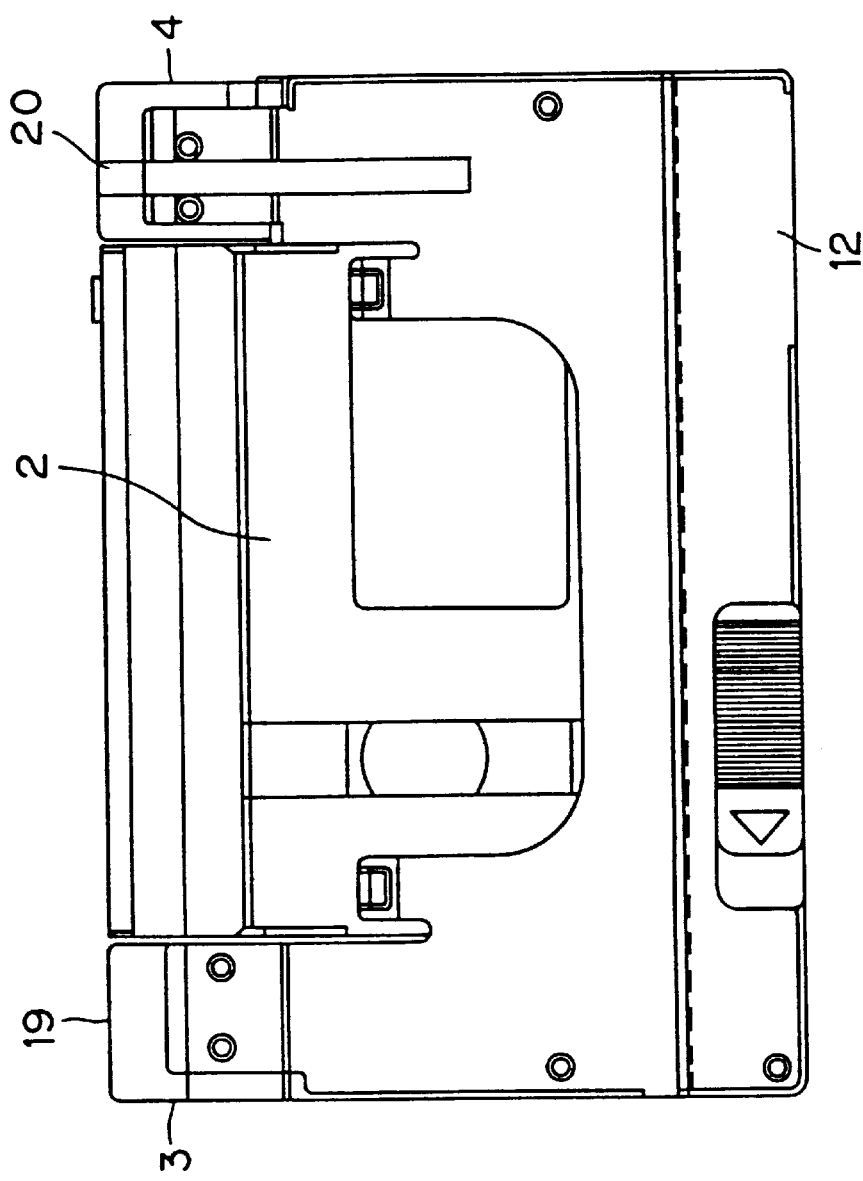
FIG. 3(a) is a plane view of a casette adapter according to a second embodiment of the present invention, and FIG. 3 (b) is the side view.

Now in the following, a second embodiment according to the present invention is described referring to FIGS. 3 through 5. FIG. 3 illustrates a casette adapter which conforms with the professional digital video format, FIG. 4 shows the vicinity of a casette loading mechanism of a magnetic recording/reproducing apparatus compatible with the casette adapter, and FIG. 5 shows the vicinity of a casette loading mechanism of a magnetic recording/reproducing apparatus incompatible with the casette adapter.

As shown in FIG. 3, an adapter 19 assumes the shape of M-casette and is provided with casette guides 3, 4 at the right and left of the adapter for guiding an S-casette 2 to the centre of adapter 19 and a groove 20 in the top surface for distinguishing the adapter from M-casette. The rest portion of the adapter 19 remains the same as those of said first embodiment. In place of the groove 20, a hollow (not shown) may serve the same purpose.

Figure 4:
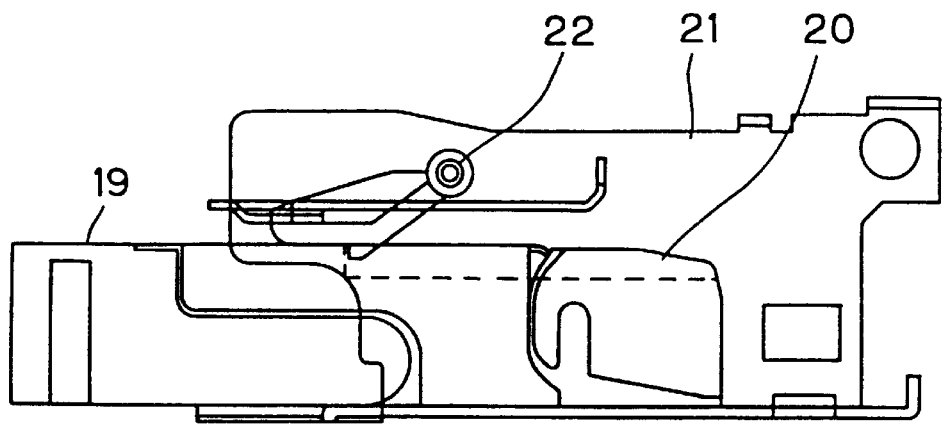
FIG. 4 is a side view showing a casette holder of a casette adapter-compatible magnetic recording/reproducing apparatus.

A magnetic recording/reproducing apparatus compatible with the adapter 19 comprises a casette holder 21 for accepting a casette or an adapter 19, as shown in FIG. 4. A shutter 22 identifies whether it is an adapter 19 or not. When an adapter 19 is loaded in a magnetic recording/reproducing apparatus, the magnetic recording/reproducing apparatus modifies the mechanical and the electrical systems; viz. the reel positioning, the casette reel brake releasing position, the tape tensioning and the signal processing are modified to be suitable to the loading of adapter 19.

Figure 5:
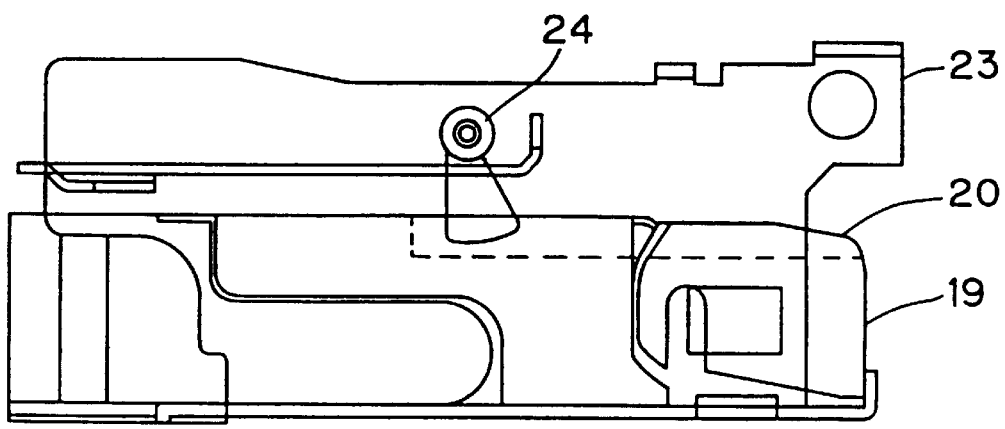
FIG. 5 is a side view showing a casette holder of a magnetic recording/reproducing apparatus incompatible with casette adapter.
Figure 6:
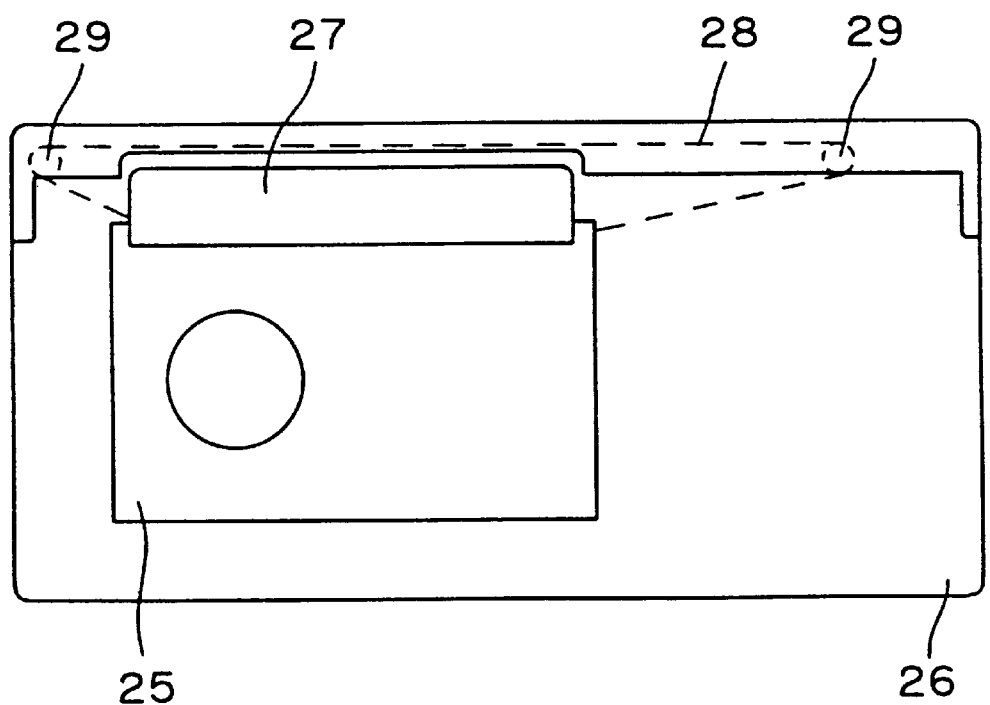
FIG. 6 is a plane view of an adapter for the VHS C-casette.

A magnetic recording/reproducing apparatus incompatible with the adapter 19 comprises a casette holder 23 for receiving a casette or an adapter 19, as shown in FIG. 5. In the case when an adapter 19 is inserted, a stopper 24 blocks loading of the adapter 19.

Now in the following, description will be made on how the above mentioned structure operates. When an adapter 19 is inserted to the casette holder 21 of a magnetic recording/reproducing apparatus compatible with adapter 19, the shutter 22 moves in compliance with groove 20 provided in the top surface of adapter 19 to identify that it is an adapter 19, as shown in FIG. 4, and the arrangement of mechanical and electrical systems in the magnetic recording/reproducing apparatus are modified accordingly.

When an adapter 19 is inserted to casette holder 23 of a magnetic recording/reproducing apparatus incompatible with adapter 19, the stopper 24 touches groove 20 provided in the top surface of adapter 19, as shown in FIG. 5, and blocks further insertion of the adapter 19.

INDUSTRIAL APPLICABILITY

A casette adapter according to the present invention comprises an adapter having a same shape as a second casette, the size being different from the first casette, for mounting a first casette in; wherein the reel and the reel brake releasing member of the first casette are exposed while the first casette is being mounted in the adapter. When an adapter incorporating an S-casette is used, the reel and the reel brake releasing member of an S-casette mounted in the adapter remain in the same location as they were as an S-casette. Therefore, there is no need of providing mechanisms for coupling respectively the reel operation and the reel brake releasing member. Thus an adapter may be constituted very simple.

The adapter is provided with a rear door, which door comprises a contact for reading identification signal by touching the identification terminal of S-casette, a means for coupling the contact with an identification terminal disposed at a same location as that of an M-casette and a means to open/close the anti-erasing window in linkage with the anti-erasing gear of an S-casette mounted in the adapter. As the reading of identification signal of S-casette and the open/close work of anti-erasing window are performed solely by the rear door, a high reliability is ensured with respect to these actions because of the simple structure.

Thanks to a means for releasing the lock on a casette lid provided to protect magnetic tape of the first casette which works in compliance with a lid unlocking mechanism of magnetic recording/reproducing apparatus, the casette lid of S-casette is kept closed by its own lock mechanism even after it is inserted in the adapter, and the tape is protected from a possible damage and intrusion of dusts into the S-casette is prevented.

By making the shape of a part of adapter different from that of the M-casette, an adapter whose shape is identical to the M-casette is easily distinguished from the M-casette. By providing a groove or a hollow in a part of adapter, an adapter whose shape is identical to the M-casette is easily distinguished from the M-casette.

In a magnetic recording/reproducing apparatus according to the present invention which receives a casette adapter of a same shape as the M-casette incorporating an S-casette of a different size and comprises a shape identification means for distinguishing the casette adapter from the M-casette, the mechanical and the electrical systems are modified based on detection result obtained from the shape identification means to be suitable to operate the casette adapter. Therefore the casette adapter is identified without fail when a casette adapter is inserted in a casette adapter-compatible magnetic recording/reproducing apparatus, and the mechanical and the electrical systems are modified to be suitable to loading of casette adapter.

Based on detection result obtained from the shape identification means of magnetic recording/reproducing apparatus, the reel positioning, the casette reel brake releasing position, the tape tensioning and the signal processing of the magnetic recording/reproducing apparatus are modified to be suitable for a casette adapter. Therefore, when a casette adapter is inserted, the mechanical and the electrical systems are easily modified to accept the loading of casette adapter.

In a magnetic recording/reproducing apparatus according to the present invention which receives a casette adapter of a same shape as the M-casette incorporating an S-casette of a different size and comprises a shape identification means for distinguishing the casette adapter from the M-casette, the further insertion of a casette adapter to the magnetic recording/reproducing apparatus is blocked based on detection result obtained from said shape identification means. Therefore, an errorneous insertion of a casette adapter to a casette-incompatible magnetic recording/reproducing apparatus is readily prevented.

What is claimed is:

1. A magnetic recording/reproducing apparatus which accepts a cassette adapter having a same shape as a second cassette, said cassette adapter capable of receiving a first cassette, said first cassette and said second cassette being different sizes, said apparatus comprising a shape identification means for distinguishing the cassette adapter from the second cassette, wherein based on a detection result obtained from the shape identification means further insertion of said cassette adapter into the magnetic recording/reproducing apparatus is blocked.

2. A magnetic recording/reproducing apparatus according to claim 1, wherein said shape identification means comprises a stopper member which engages a portion of said cassette adapter so as to prevent further insertion of said cassette adapter into said apparatus.

3. A magnetic recording/reproducing apparatus according to claim 2, wherein said cassette adapter comprises a groove having a rear wall, said stopper member being disposed within said groove so as to prevent further forward movement of said cassette adapter.

4. A magnetic recording/reproducing apparatus according to claim 1, wherein said first cassette is a S-cassette and said second cassette is a M-cassette.

\* \* \* \* \*